(12) United States Patent
Urban et al.

(10) Patent No.: US 6,312,512 B1
(45) Date of Patent: Nov. 6, 2001

(54) QUINACRIDONE MIXED-CRYSTAL PIGMENTS OF THE GAMMA PHASE

(75) Inventors: Manfred Urban, Wiesbaden; Martin Boehmer, Neu-Anspach; Joachim Weber, Frankfurt; Dieter Schnaitmann, Eppstein; Margit Haberlick, Bad Camberg, all of (DE)

(73) Assignee: Clariant GmbH, Frankfurt (DE)

( * ) Notice: Subject to any disclaimer, the term of this patent is extended or adjusted under 35 U.S.C. 154(b) by 0 days.

(21) Appl. No.: 09/482,171

(22) Filed: Jan. 12, 2000

(30) Foreign Application Priority Data

Jan. 14, 1999 (DE) .............................. 199 01 060

(51) Int. Cl.$^7$ .............................. C09B 48/00; C09B 67/52
(52) U.S. Cl. ................. 106/495; 106/31.77; 524/86; 546/49; 546/56
(58) Field of Search ............................... 106/495, 497, 106/31.77; 524/86; 546/49, 56

(56) References Cited

U.S. PATENT DOCUMENTS

| | | | |
|---|---|---|---|
| 2,844,484 | 7/1958 | Reidinger et al. | 106/288 |
| 3,074,950 | 1/1963 | Deuschel et al. | 260/279 |
| 3,160,510 | 12/1964 | Ehrich | 106/288 |
| 3,836,379 | 9/1974 | Kirsch et al. | 106/288 Q |
| 4,099,980 | 7/1978 | North | 106/288 Q |
| 4,732,618 | * 3/1988 | Spietschka et al. | 106/288 |
| 4,777,105 | 10/1988 | Macholdt et al. | 430/109 |
| 4,895,949 | 1/1990 | Jaffe et al. | 546/56 |
| 5,145,524 | * 9/1992 | Ganci | 106/493 |
| 5,236,498 | 8/1993 | Zaloum et al. | 106/495 |
| 5,591,258 | 1/1997 | Urban et al. | 106/497 |
| 5,614,014 | 3/1997 | Urban | 106/495 |
| 5,755,872 | 5/1998 | Urban et al. | 106/495 |
| 5,755,874 | 5/1998 | Urban et al. | 106/497 |
| 5,958,129 | 9/1999 | Urban et al. | 106/498 |
| 5,989,333 | 11/1999 | Urban et al. | 106/495 |

FOREIGN PATENT DOCUMENTS

| | | |
|---|---|---|
| 244453 | 12/1961 | (AU) . |
| 1 184 881 | 1/1965 | (DE) . |
| 1 569 787 | 7/1970 | (DE) . |
| 0 267 877 | 5/1988 | (EP) . |
| 0 530 142 A1 | 3/1993 | (EP) . |
| 955854 | 4/1964 | (GB) . |
| 1002641 | 8/1965 | (GB) . |
| 1017443 | 1/1966 | (GB) . |
| 53-39324 | 4/1978 | (JP) . |

OTHER PUBLICATIONS

Derwent Abstract of EP 0 267 877 (Jan. 1965).
Chemical Abstracts of DE 1 184 881 (Aug. 1965).
Derwent Abstract EP 348347 (Dec. 1989).
Derwent Abstract EP 655485 (May 1995).
Derwent Abstract EP 799862 (Oct. 1997).

* cited by examiner

Primary Examiner—Anthony Green
(74) Attorney, Agent, or Firm—Susan S. Jackson; Scott E. Hanf

(57) ABSTRACT

The invention relates to novel quinacridone mixed crystal pigments consisting of a) from 82.5 to 99% by weight of unsubstituted γ-phase quinacridone of the formula (I)

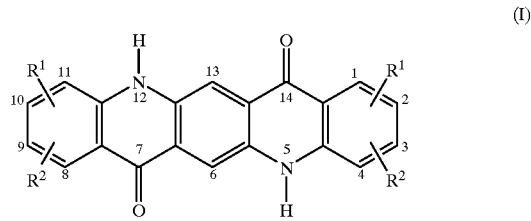

(I)

in which $R^1$ and $R^2$ are hydrogen atoms and b) from 1 to 17.5% by weight of one or more 2,9- and/or 3,10-substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which can be substituted by $C_1$–$C_6$-alkyl groups, and $R^1$ can additionally be a hydrogen atom, and to pigment preparations comprising said quinacridone mixed crystal pigments.

20 Claims, No Drawings

QUINACRIDONE MIXED-CRYSTAL PIGMENTS OF THE GAMMA PHASE

The present invention relates to novel quinacridone mixed crystal pigments and to their use as colorants for pigmenting high molecular mass organic materials.

BACKGROUND OF THE INVENTION

Quinacridones are known compounds which are used as pigments. In practice, stringent requirements are placed on their fastness and color properties. On the industrial scale they are prepared by oxidizing dihydroquinacridones in an alkaline medium in the presence of solvents and then dry- or wet-grinding the resulting coarsely crystalline crude pigments, or by ring closure of 2,5-dianilinoterephthalic acid in polyphosphoric acid or polyphosphoric ester and then phase-converting and finishing the resulting finely divided crude pigments with organic solvents.

The preparation of quinacridone mixed crystal pigments is described in the following patent documents.

U.S. Pat. No. 4,099,980 describes the preparation of quinacridone mixed crystal pigments, consisting of 85–99% unsubstituted quinacridone and 1–15% 4,11-dichloroquinacridone, which are in the γ phase of the unsubstituted quinacridone.

U.S. Pat. No. 3,160,510 describes the preparation of quinacridone mixed crystal pigments by dry-milling the crude pigment mixtures with salt and then solvent-treating the isolated ground materials or by precipitating the pigment mixtures with sulfuric acid and then solvent-treating the dried finely divided crude pigments.

For unsubstituted quinacridone of the γ phase, four phases are described.

The γI phase is described in U.S. Pat. No. 3,074,950 and in EP-A 0 267 877. In the X-ray spectrum, at twice the Bragg angle 2θ, it shows three strong lines at 6.6°, 13.9° and 26.5°, three moderate lines at 13.2°, 13.5° and 23.8°, and four weak lines at 17.1°, 20.5°, 25.2° and 28.6°.

The γII phase is described in U.S. Pat. No. 2,844,484, in EP-A 0 267 877 and in DE-C 1 184 881. In the X-ray spectrum, at twice the Bragg angle 2θ, it shows three strong lines at 6.6°, 13.9° and 26.3°, five moderate lines at 13.2°, 13.4° and 23.6°, 25.2° and 28.3° and two weak lines at 17.1° and 20.4°.

The γIII phase is described In EP-A 0 530 142. In the X-ray spectrum, at twice the Bragg angle 2θ, it shows four strong lines at 6.7°, 13.3°, 14.0° and 26.6°, one moderate line at 13.6°, and seven weak lines at 17.2°, 20.6°, 21.9°, 24.0°, 25.3°, 28.1° and 28.8°.

The γIV phase is described in Japanese Laid-Open Specification JP-A 53-39324. In the X-ray spectrum, at twice the Bragg angle 2θ, it shows three strong lines at 6.2°, 13.6° and 26.5°, three moderate lines at 12.5°, 25.8° and 27.7°, 2θ and three weak lines at 16.5°, 20.5° and 24.0°. The moderate lines at 25.8° and 27.70°2θ are to be attributed to small amounts of α phase.

SUMMARY OF THE INVENTION

It has been found that mixtures comprising from 82.5 to 99% unsubstituted γ-phase quinacridone and from 1 to 17.5% of one or more, especially 1 or 2, substituted quinacridones will form mixed crystals, also referred to as solid solutions, under certain conditions in accordance with the invention. By mixed crystals are understood systems in which one or more components added—usually in a nonstoichiometric ratio—to a crystal phase crystallize together with the host compound in a common lattice. The X-ray diffraction diagram of a mixed crystal shows, for example, only the reflections of the (in many cases expanded) crystal lattice of the host compound or else of a similar crystal lattice or else of a markedly different crystal lattice, whereas the reflections of all the components can be detected in the X-ray diffraction diagram of a corresponding mechanical mixture.

DESCRIPTION OF THE PREFERRED EMBODIMENTS

The invention therefore provides mixed crystal pigments of the quinacridone series consisting of a) from 82.5 to 99% by weight, preferably from 85 to 95% by weight, in particular from 87 to 93% by weight, of unsubstituted γ-phase quinacridone of the formula (I)

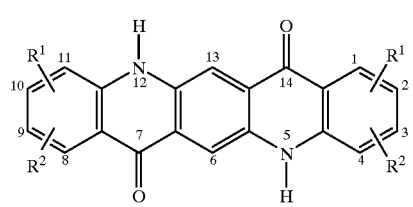

(I)

in which $R^1$ and $R^2$ are hydrogen atoms and b) from 1 to 17.5% by weight, preferably from 5 to 15% by weight, in particular from 7 to 13 % by weight, of one or more 2,9- and/or 3,10-substituted quinacridones of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which can be substituted by $C_1$–$C_6$-alkyl groups, and $R^1$ can additionally be a hydrogen atom.

Preferred mixed crystal pigments are those which comprise one or two substituted quinacridones (b) of the formula (I) in which $R^1$ is hydrogen, chloro, methyl, methoxy or carboxamido, and $R^2$ is chloro, methyl, methoxy or carboxamido.

The color properties of the mixed crystal pigments of the invention differ considerably from those of the corresponding mechanical mixtures of the individual components. In particular, they possess deeper hues and have high color strengths. The process can also be used to obtain highly transparent pigments which are therefore particularly suitable for the production of metallic paints. The fastness properties are excellent.

The present invention also provides a process for preparing the above described mixed crystal pigments, which comprises cyclizing the 2,5-dianilinoterephthalic acid of the formula (Ia)

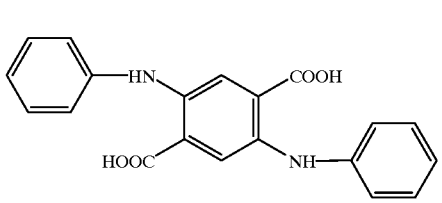

(Ia)

on which the compound a) is based and the substituted terephthalic acid(s) of the formula (Ib)

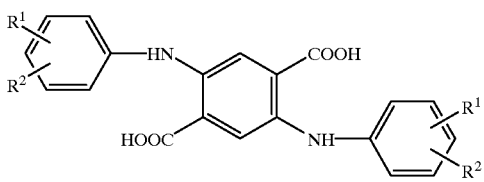

(Ib)

on which the compound b) is based in a ratio of from 82.5:17.5 to 99:1, preferably from 85:15 to 95:5, in particular from 87:13 to 93:7, in the presence of polyphosphoric acid, a polyphosphoric ester, preferably polyphosphoric methyl ester, or a mixture thereof, hydrolyzing the ring closure mixture which is present after cyclization, at a temperature of at least 110° C., by metering into an amount of at least 70% strength by weight, preferably from 75 to 98% strength by weight, in particular from 80 to 90% strength by weight, aqueous orthophosphoric acid which is such that at the end of the metered addition the concentration of aqueous orthophosphoric acid in the hydrolyzed mixture is at least 85% by weight, and then isolating the mixed crystal pigment, directly or following a fine division step and/or a finish treatment.

As the ring closure agent use is generally made of from 2.5 to 10 times, preferably from 3 to 5 times, the amount by weight of polyphosphoric acid or polyphosphoric ester, based on the dianilinoterephthalic acids. The $P_2O_5$ content of the polyphosphoric acid or ester is judiciously between 80 and 87% by weight, preferably between 83 and 85% by weight, corresponding to a phosphoric acid equivalent of from 110 to 120%. Larger amounts of ring closure agent can be used but are generally unnecessary. The ring closure temperature is judiciously from 80 to 200° C., preferably from 120 to 140° C. The time taken to complete cyclization is in general from 0.5 to 24 hours, but usually only 1 to 2 hours.

The ring closure mixture which is present after the cyclization is hydrolyzed at a temperature of at least 110° C., preferably at from 120 to 180° C., in particular from 130 to 160° C. In this case the ring closure mixture, under pressure if desired, is metered into the orthoohosphoric acid, it being possible to use a continuous or batchwise procedure. It is advantageous to operate continuously in a static or mechanical mixer. Based on the polyphosphoric acid, it is judicious to use from 0.8 to 10 times the amount of orthophosphoric acid. In principle it is also possible to use a less than 70% strength by weight orthophosphoric acid. However, since the final concentration of the orthophosphoric acid at the end of the hydrolysis must not be below 85% by weight, in order to obtain the desired γ phase, in this case the amount by volume of orthophosphoric acid to be used would be so small that the hydrolysis mixture would be of a consistency that was no longer stirtable. Preferably, the concentration of orthophosphoric acid in the hydrolysis mixture at the end of the hydrolysis is from 87 to 98% by weight, in particular from 88 to 95% by weight.

The duration of the hydrolysis depends on the metering rate. It is advantageous to conduct metering using a concentration gradient of at least 10% per minute, preferably at least 20% per minute, in particular from 50% to 100% per minute. By the concentration gradient (CG) is meant the relative increase in the concentration of orthophosphoric acid in the hydrolysis mixture in percent per unit time, based on the respective initial and final concentration of ortho-phosphoric add. In the course of the hydrolysis, the desired mixed crystal quinacridone precipitates in the γ phase, so that after the end of the hydrolysis it is possible, in order to facilitate isolation, to dilute the phosphoric acid-containing mixture with water or dilute orthophosphoric acid without transforming the γ phase into a different phase.

The aftertreatment of the hydrolyzed ring closure mixtures with water or dilute orthophosphoric acid can be conducted at elevated temperature, preferably at from 120 to 180° C., for, for example, from 0.5 to 24 hours, preferably from 1 to 5 hours. It is, however, also possible to isolate the mixed crystal pigment, prepigment or crude pigment from the hydrolysis mixture after the end of hydrolysis without said aftertreatment.

Depending on the choice of dianilinoterephthalic acids and on the hydrolysis and/or aftertreatment conditions employed, suspensions are formed of mixed crystal pigments, finely divided mixed crystal prepigments, or coarsely crystalline crude mixed crystal pigments into at least 85% strength orthophosphoric acid as the liquid phase.

Mixed crystal pigments are normally isolated directly by filtration. Before the filtration, the concentration of the phosphoric acid can be lowered, to below 70%, for example, by adding water or dilute phosphoric acid.

Mixed crystal prepigments and crude mixed crystal pigments must be subjected to a further aftertreatment. Mixed crystal prepigments are subjected, with or without isolation beforehand, to a thermal aftertreatment (finish) with or without the addition of solvents at a temperature of from 50 to 200° C., if desired under increased pressure, for from 0.5 to 24 hours, and following the separation of the solvent are isolated.

The coarsely crystalline crude mixed crystal pigments are subjected to mechanical fine division and then the resulting mixed crystal pigments are isolated in a customary manner or are subjected, with or without isolation beforehand, to a finish treatment, as described above, and following the separation of the solvent are isolated.

Fine division can be brought about by dry or wet grinding. Preference is given to wet grinding with high energy input, since for this purpose it is not necessary to dry the crude mixed crystal pigment, wet grinding taking place, for example on a stirred ball mill having a power density of more than 1.0 kW per liter of milling space and a stirrer tip speed (peripheral stirrer speed) of more than 12 m/s.

Dry grinding is suitably conducted using all batchwise or continuous vibrating mills or roll mills, and wet grinding using all batchwise or continuous stirred ball mills, roll mills and vibrating mills and also kneading apparatus.

For wet grinding, the crude mixed crystal pigment suspensions directly or, following isolation beforehand, or the water-moist presscakes or the dried, coarsely crystalline crude mixed crystal pigments are diluted to a millable consistency with water or dilute sodium hydroxide solution. The grinding media used are beads of zirconium oxide, zirconium mixed oxide, aluminum oxide, steel or quartz with a diameter of from 0.2 to 20 mm. The duration of grinding is judiciously between 5 and 60 minutes, preferably between 7.5 and 30 minutes.

The mixed crystal prepigments which are present after hydrolysis and after fine division can be subjected to a finish treatment in aqueous suspension, directly or following the addition of solvents. The conditions to be observed for conducting the finish treatment are to a high degree dependent on the desired properties of the mixed crystal pigments and are directed in each case toward that aim. Normally, the suspension of the mixed crystal prepigments in the relevant medium is treated at a temperature in the range between 50 and 200° C., at atmospheric or elevated pressure, for from 0.5 to 24 hours. In general, the suspension obtained after wet grinding is employed for this purpose, without isolation of the millbase beforehand. The amount of solvent added here can vary within wide limits. It is preferred to use from the same up to 5 times the amount by weight of solvent, based on the weight of the mixed crystal prepigments. Thermal treatment in the aqueous, aqueous-organic, or organic medium takes place preferably at from 50 to 150° C. for from 1 to 6 hours. When the finish is complete, the solvents used for that purpose can be recovered by distillation and used again. Utilizing the variants available in this way it is possible, depending on the end use, to convert the mixed crystal prepigments obtained by the process of the invention into a higher-hiding or more transparent form, which can be controlled via the solvency of the relevant solvent, its concentration, the chosen temperature and the duration of the finish treatment.

In order to improve the color properties and to obtain particular color effects it is possible at any point in the process to add solvents, pigment dispersants, surfactants, defoamers, extenders or other additives. It is also possible to use mixtures of these additives. The additives can be added all at once or in two or more portions. The addition can for example be made before, during or after ring closure, during hydrolysis, during grinding or during the finish treatment, or during or after isolation. The most suitable point in time must be determined beforehand by guideline experiments.

Suitable surfactants are anionic, cationic and nonionic surfactants.

Examples of suitable anionic surfactants are fatty acid taurides, fatty acid N-methyltaurides, fatty acid isethionates, alkylbenzenesulfonates, alkylnaphthalenesulfonates, alkylphenol polyglycol ether sulfates and fatty alcohol polyglycol ether sulfates, fatty acids, e.g, palmitic, stearic and oleic acid, soaps, e.g., alkali metal salts of fatty acids, naphthenic acids and resin acids, e.g., abietic acid, and alkali-soluble resins, e.g., rosin-modified maleate resins.

Examples of suitable cationic surfactants are quaternary ammonium salts, fatty amine ethoxylates, fatty amine polyglycol ethers and fatty amines. Examples of nonionic surfactants are fatty alcohol polyglycol ethers, fatty acid polyglycol esters and alkylphenol polyglycol ethers.

Suitable pigment dispersants employed in the course of the process are compounds having the formula (II)

(II)

in which m is a number between 1 and 4;

P is an m-valent radical of a linear quinacridone of the formula (I) in which $R^1$ and $R^2$ are hydrogen atoms or methyl groups, X is a group of the formula (III)

—COOM (III)

or a group of the formula (IV)

(IV)

in which

M is the hydrogen ion $H^+$ or the equivalent $M^{r+}/r$ of an r-valent metal cation, where r is—for the case in question, uniformly—one of the numbers 1, 2 and 3, examples being $Li^{1+}$, $Na^{1+}$, $K^{1+}$, $Mg^{2+}$, $Ca^{2+}$, $Sr2+$, $Ba^{2+}$, $Mn^{2+}$, $Cu^{2+}$, $Ni^{2+}$, $Co^{2+}$, $Zn^{2+}$, $Fe^{2+}$, $Al^{3+}$, $Cr^{3+}$ or $Fe^{3+}$; or an ammonium ion having the structure $N^+R^3R^4R^5R^6$, where the substituents $R^3$, $R^4$, $R^5$ and $R^6$ on the quaternary nitrogen atom are each individually and independently of one another hydrogen atoms or $C_1$–$C_{30}$ alkyl, $C_2$–$C_{30}$-alkenyl or $C_5$–$C_{30}$-cycloalkyl groups, which can be substituted by hydroxyl, di($C_1$–$C_4$-alkyl)amino, carboxyl or carboxamido groups, or by the group

in which v is a number between 2 and 20, or by the group $C_2$–$C_6$-alkyl-N+ $R^4R^5R^6$, or X is a group of the formula (V)

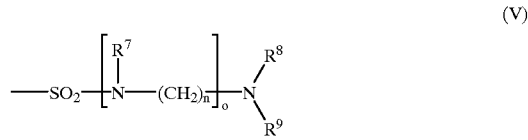
(V)

in which $R^8$ and $R^9$ independently of one another are each a hydrogen atom, a $C_1$–$C_{20}$-alkyl or $C_2$–$C_{20}$-alkenyl group or a $C_5$–$C_7$-cycloalkyl group, or in which $R^8$ and $R^9$, together with the adjacent nitrogen atom, form an aliphatic or aromatic, five- or six-membered heterocyclic system having in each case from 1 to 3 identical or different ring-member heteroatoms from the group consisting of nitrogen, oxygen and sulfur, $R^7$ is a hydrogen atom or a $C_1$–$C_4$-alkyl group, n is a number from 1 to 6, o is the number 0 or 1; or X is a group of the formula (VI)

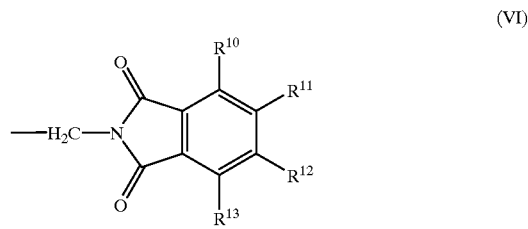
(VI)

in which $R^{10}$, $R^{12}$ and $R^{13}$ are each a hydrogen, fluorine, chlorine or bromine atom and $R^{11}$ is a hydrogen, fluorine, chlorine or bromine atom or is a nitro, $C_1$–$C_5$-alkyl, $C_1$–$C_6$-alkoxy or benzoylamino group.

Preference is given to pigment dispersants having the formula (II) in which P is the radical of unsubstituted linear quinacridone and X is the phthalimidomethylene group or the sulfonamido group.

Per weight unit of mixed crystal pigment, crude pigment or prepigment it is possible to add from 0.1 to 20% by weight, preferably from 1 to 10% by weight, of said pigment dispersants and/or surfactants.

Examples of solvents are: alicyclic hydrocarbons, such as cyclohexane; $C_1$–$C_8$-alkanols, alicyclic alcohols and polyhydric alcohols, such as methanol, ethanol, n- or isopropanol, n- or isobutanol, tert-butanol, pentanols, hexanols, cyclohexanol, ethylene glycol, propylene glycol, glycerol; $C_1$–$C_5$-dialkyl ketones or cyclic ketones, such as acetone, diethyl ketone, methyl isobutyl ketone, methyl ethyl ketone or cyclohexanone; ethers and glycol ethers, such as the monomethyl or monoethyl ether of ethylene glycol and propylene glycol, butylglycol, ethyldiglycol or methoxybutanol; aromatic hydrocarbons, such as toluene, xylenes or ethylbenzene, cyclic ethers, such as tetrahydrofuran, chlorinated aromatic hydrocarbons, such as chlorobenzene, o-dichlorobenzene, 1,2,4-trichlorobenzene or bromobenzene; substituted aromatic compounds, such as benzoic acid, nitrobenzene or phenol; aliphatic carboxamides, such as formamide or dimethylformamide; cyclic carboxamides, such as N-methylpyrrolidone; $C_1$–$C_4$-alkyl carboxylates, such as butyl formate, ethyl acetate or propyl propionate; carboxylic acid $C_1$–$C_4$-glycol esters, $C_1$–$C_4$-alkyl phthalates and $C_1$–$C_4$-alkyl benzoates, such as ethyl benzoate; heterocyclic bases, such as pyridine, quinoline, morpholine or picoline; and also dimethyl sulfoxide and sulfolane.

Preferred solvents are alkanols, especially ethanol, propanols, butanols and pentanols; aliphatic carboxamides such as formamide or dimethylformamide; cyclic carboxamides, especially N-methylpyrrolidone; aromatic hydrocarbons, such as toluene, xylenes or ethylbenzene; and chlorinated aromatic hydrocarbons, such as chlorobenzene or o-dichlorobenzene.

The preparation of mixed crystal pigments by the process of the invention has been found to be particularly economic and environment-friendly since the hydrolysis products can be obtained directly as mixed crystal pigments. The claimed process uses only small amounts of chemicals and solvents which can subsequently be processed further or completely regenerated again. Consequently, no disposal problems arise. The mixed crystal pigments obtainable by the present invention are notable for their outstanding coloristic and rheological properties, and for their ease of dispersibility, good luster characteristics and high color strength. It is also possible to prepare highly transparent mixed crystal pigments especially suitable for use in metallic paints.

The mixed crystal pigments prepared in accordance with the invention can be used to pigment high molecular mass organic materials of natural or synthetic origin, such as plastics, resins, coating materials or printing inks, for example.

Examples of high molecular mass organic materials pigmentable with said pigments are cellulose ethers and cellulose esters, such as ethylcellulose, nitrocellulose, cellulose acetate or cellulose butyrate, natural resins or synthetic resins, such as addition polymerization resins or condensation resins, examples being amino resins, especially urea- and melamine-formaldehyde resins, alkyd resins, acrylic resins, phenolic resins, polycarbonates, polyolefins, such as polystyrene, polyvinyl chloride, polyethylene, polypropylene, polyacrylonitrile, polyacrylates, polyamides, polyurethanes or polyesters, rubber, casein, silicone and silicone resins, individually or in mixtures.

In this context it is irrelevant whether the high molecular mass organic compounds referred to are in the form of plastic masses or melts or in the form of spinning solutions, varnishes, paints or printing inks. Depending on the intended use it is found advantageous to utilize the pigments obtained in accordance with the invention as blends or in the form of preparations or dispersions. Based on the high molecular mass organic material to be pigmented, the pigments of the invention are employed in an amount of preferably from 0.1 to 10%.

The mixed crystal pigments of the invention are suitable as colorants in electrophotographic toners and developers, such as, for example, one- or two-component powder toners (so-called one- or two-component developers), magnetic toners, liquid toners, latex toners, polymerization toners and specialty toners. Typical toner binders are addition polymerization resins, polyaddition resins and polycondensation resins, such as styrene resins, styrene-acrylate resins, styrene-butadiene resins, acrylate resins, polyester resins, phenol-epoxy resins, polysulfones, polyurethanes, individually or in combination, and also polyethylene and polypropylene, which may also contain further ingredients, such as charge control agents, waxes or flow aids, or may be modified subsequently with these additives.

Furthermore, the mixed crystal pigments of the invention are suitable as colorants in powders and powder coating materials, especially in triboelectrically or electrokinetically sprayable powder coating materials which are used to coat the surfaces of articles made, for example, from metal, wood, plastic, glass, ceramic, concrete, textile material, paper or rubber. As powder coating resins it is typical to use epoxy resins, carboxyl- and hydroxyl-containing polyester resins, polyurethane resins and acrylic resins together with customary hardeners. Resin combinations are also used. For example, epoxy resins are frequently used in combination with carboxyl- and hydroxyl-containing polyester resins. Examples of typical hardener components (depending on the resin system) are acid anhydrides, imidazoles and also dicyandiamide and its derivatives, blocked isocyanates, bisacylurethanes, phenolic resins and melamine resins, triglycidyl isocyanurates, oxazolines and dicarboxylic acids.

Furthermore, the mixed crystal pigments of the invention are suitable as colorants in inkjet inks on an aqueous and nonaqueous basis and also in those inks which operate in accordance with the hot-melt process.

The mixed crystal pigments of the invention are also suitable as colorants for color filters, both for additive and for subtractive color generation.

To evaluate the properties of the pigments prepared by the invention in the coatings sector, a selection was made, from the large number of known coating materials, of an alkyd-melamine resin varnish (AM) which contained aromatic compounds and was based on a medium-oil alkyd resin and on a butanol-etherified melamine resin, a polyester varnish (PE) based on cellulose acetobutyrate and on a melamine resin, and an aqueous, polyurethane(PU)-based varnish.

To evaluate the properties of the pigments produced by the invention in the plastics sector, a selection was made from the large number of known plastics of flexible polyvinyl chloride (PVC).

The color strength and hue were determined in accordance with DIN 55986. The rheology of the millbase following dispersion was evaluated using the following five-point scale:

5 mobile
4 liquid
3 viscous
2 slightly set
1 fully set

Following the dilution of the millbase to the pigment end concentration, the viscosity was measured with the Rossmann Viscospatula, type 301 from Erichsen.

Gloss measurements were made on samples cast out onto films, at an angle of 20° in accordance with DIN 67530 (ASTMD 523) using the "multigloss" gloss meter from Byk-Mallinckrodt.

The determination of the crystal phase of the crude mixed crystal pigments, mixed crystal prepigments and mixed crystal pigments was carried out by X-ray spectroscopy. The X-ray diffraction spectra are reproduced in digital form. The relative intensities of strong lines are 51–100%; of moderate lines, 11–50%; and of weak lines, 2–10%.

In the preceding text and in the examples below, parts and percentages are in each case based on the weight of the substances so described. "CG" denotes concentration gradient.

EXAMPLES

Example 1

450 parts of polyphosphoric acid containing 85.0% $P_2O_5$ are metered into a stirred vessel. Then 135 parts of 2,5-dianilinoterephthalic acid and 15 parts of 2,5-di(3-chloroanilino)terephthahic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 1607.5 parts of 80% strength phosphoric acid at 135° C., during which it is hydrolyzed. During this hydrolysis the temperature rises to 150° C. The phosphoric acid concentration after the hydrolysis is 87.5%. Then 1209.2 parts of 40% strength phosphoric acid are added dropwise and the suspension is cooled to 120° C. The phosphoric acid concentration thereafter is 70%. The mixture is stirred at 120° C. for 1 hour. Subsequently the mixed crystal pigment is filtered off with suction at 110° C., washed with 70% strength phosphoric acid until the runoff is colorless, washed to neutrality with water, and dried at 80° C. This gives 133.4 parts of mixed crystal pigment (Pigment Violet 19, γII phase). At twice the Bragg angle, 2θ, X-ray spectrum shows three strong lines at 6.3°, 13.5° and 26.4°, three moderate lines at 16.1°, 16.5° and 24.0°, and one weak line at 20.8°. In the AM lacquer, transparent, pure and strongly colored coatings of deep hue are obtained. The rheology is evaluated as 3 and the viscosity is 4.2 s. The gloss measurement gives a value of 56.

Comparative Example 1

Repeating the above example but using exclusively 150 parts of 2,5-dianilinoterephthalic acid instead of a mixture of 135 parts of 2,5-dianilinoterephthalic acid and 15 parts of 2,5-di(3-chloroanilino)terephthalic acid gives quinacridone which is in the β phase.

Example 2

19 parts of mixed crystal pigment from Example 1 are mixed mechanically with 1 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent, pure and strongly colored coatings of deep hue are obtained. The rheology is evaluated as 4–5 and the viscosity is 4.2 s. The gloss measurement gives a value of 72.

Example 3

450 parts of polyphosphoric acid containing 85.0% $P_2O_5$ are metered into a stirred vessel. Then 135 parts of 2,5dianilinoterephthalic acid and 15 parts of 2,5-di(3-chloroanilino)terephthalic acid are introduced at 125° C. with stirring and the mixture is heated at 125° C. for 1 hour during which ring closure takes place to form the quinacridone. The reaction midure is subsequently metered with stirring over 2 minutes (CG; 50%/min) into 2187.9 parts of 85% strength phosphoric acid at 140° C., during which it is hydrolyzed. During this hydrolysis the temperature rises to 155° C. The phosphoric acid concentration after the hydrolysis is 90%. Then 1768.9 parts of 40% strength phosphoric acid are added dropwise and the suspension is cooled to 120° C. The phosphoric acid concentration thereafter is 70%. The mixture is stirred at 120° C. for 1 hour. Subsequently the mixed crystal pigment is filtered off with suction at 110° C., washed with 70% strength phosphoric acid until the runoff is colorless, washed to neutrality with water, and dried at 80° C. This gives 132.8 parts of mixed crystal pigment (Pigment Violet 19, γII phase). At twice the Bragg angle, 2θ, X-ray spectrum shows three strong lines at 6.3°, 13.5° and 26.4°, four moderate lines at 16.6°, 20.6°, 24.0° and 28.3°, and one weak line at 30.3°. In the AM lacquer, transparent, pure and strongly colored coatings of deep hue are obtained. The rheology is evaluated as 3–4 and the viscosity is 4.5 s. The gloss measurement gives a value of 60.

Example 4

19 parts of mixed crystal pigment from Example 3 are mixed mechanically with 1 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0.

A pigment preparation is obtained. In the AM lacquer, transparent, pure and strongly colored coatings of deep hue are obtained. The rheology is evaluated as 5 and the viscosity is 4.8 s. The gloss measurement gives a value of 81.

Example 5

450 parts of polyphosphoric acid containing 85.0% $P_2O_5$ are metered into a stirred vessel. Then 127.5 parts of 2,5-dianilinoterephthalic acid and 22.5 parts of 2,5-(3-chloroanilino)terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min into 574 parts of 80% strength phosphoric acid at 140° C., during which it is hydrolyzed. During this hydrolysis the temperature rises to 160° C. The phosphoric acid concentration after the hydrolysis 95%. The mixture is left to cool to 150° C. and is stirred at 150° C. for 4 hours. The 1428.8 parts of water are added dropwise and the suspension cools to 90° C. The mixture is stirred at 90° C. for 1 hour. The phosphoric acid concentration thereafter is 40%. Subsequently the pigment is filtered off with suction, washed to neutrality with water, and dried at 80° C. This gives 134 parts of mixed crystal pigment (Pigment Violet 19, γIV phase). At twice the Bragg angle, 2θ, X-ray spectrum shows three strong lines at 6.4°, 13.5° and 26.5°, eight moderate lines at 10.5°, 13.2°16.1°, 16.8°, 20.5°, 21.4°, 24.0° and 28.3°, and one weak line at 30.1°. Lines of 3,10-dichloroquinacridone cannot be detected.

19 parts of mixed crystal pigment are mixed mechanically with 1 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent, pure and strongly colored coatings are obtained. The rheology is evaluated as 5 and the viscosity is 3.4 s. The gloss measurement gives a value of 80.

Example 6

450 parts of polyphosphoric acid containing 85.0% $P_2O_5$ are metered into a stirred vessel. Then 127.5 parts of 2,5-dianilinoterephthalic acid and 22.5 parts of 2,5-di(3-chloroanilino) terephthalic acid are introduced at 125° C. with stirring and the mixture is heated at 125° C. for 1 hour during which ring closure takes place to form the quinacridone. The reaction mixture is subsequently metered with stirring over 3 minutes (CG: 33.3%/min) into 860.8 parts of 85% strength phosphoric acid at 140° C., during which it is hydrolyzed. During this hydrolysis the temperature rises to 160° C. The phosphoric acid concentration after the hydrolysis is 95%. Then 294.5 parts of 40% strength phosphoric acid are added dropwise and the suspension is cooled to 150° C. The phosphoric acid connotation thereafter is 85%. The mixture is stirred at 150° C. for 5 hours. The mixture is then cooled to 120° C. and 1822.3 parts of water are added dropwise. Thereafter the concentration of phosphoric acid is 40%. Subsequently the mixed crystal pigment is filtered off with suction, washed with 40% strength phosphoric acid until the runoff is colorless, washed to neutrality with water, and dried at 80° C. This gives 130.5 parts of mixed crystal pigment (Pigment Violet 19, γIV phase). At twice the Bragg angle, 2θ, X-ray spectrum shows three strong lines at 6.4°, 13.5° and 26.4° and five moderate lines at 17.0°, 20.5°, 21.4°, 23.9° and 28.2°.

9.5 parts of mixed crystal pigment are mixed mechanically with 0.5 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent, pure and strongly colored coatings of deep hue are obtained. The hue is shifted toward the bluer side. The rheology is evaluated as 5 and the viscosity is 3.2 s. The gloss measurement gives a value of 83.

Example 7

450 parts of polyphosphoric acid containing 85.0% $P_2O_5$ are metered into a stirred vessel Then 127.5 parts of 2,5-dianilinoterephthalic acid and 22.5 parts of 2,5-di(3-chloroanilino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 860.8 parts of 85% strength phosphoric acid at 140° C., during which it is hydrolyzed. During this hydrolysis the temperature rises to 160° C. The phosphoric acid concentration after the hydrolysis is 95%. Then 1105 parts of 40% strength phosphoric acid are added dropwise and the suspension is cooled to 120° C. The phosphoric acid concentration thereafter is 70%. The mixture is stirred at 120° C. for 3 hours. The mixture is then cooled to 110° C. and the mixed crystal pigment is filtered off with suction, washed with 70% strength phosphoric acid until the runoff is colorless, washed to neutrality with water, and dried at 80° C. This gives 131 parts of mixed crystal pigment (Pigment Violet 19, γIV phase). At twice the Bragg angle, 2θ, X-ray spectrum shows three strong lines at 6.4°, 13.5° and 26.4°, five moderate lines at 13.3°, 16.9°, 20.5°, 24.0° and 28.3°, and one weak line at 30.1°.

9.5 parts of mixed crystal pigment are mixed mechanically with 0.5 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent, pure and strongly colored coatings are obtained. The rheology is evaluated as 5 and the viscosity is 3.6 s. The gloss measurement gives a value of 85.

Example 8

450 parts of polyphosphoric acid containing 85.0% $P_2O_5$ are metered into a stirred vessel. Then 127.5 parts of 2,5-dianilinoterephthalic acid and 22.5 parts of 2,5-di(3-chloroanilino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 860.8 parts of 85% strength phosphoric acid at 140° C., during which it is hydrolyzed. During this hydrolysis the temperature rises to 160° C. The phosphoric acid concentration after the hydrolysis is 95%. Then 294.5 parts of 40% strength phosphoric acid are added dropwise and the suspension is cooled to 150° C. The phosphoric acid concentration thereafter is 85%. The mixture is stirred at 150° C. for 3 hours. The mixture is then cooled to 140° C. and the mixed crystal pigment is filtered off with suction, washed with 85% strength phosphoric acid until the runoff is colorless, washed to neutrality with water. and dried at 80° C. This gives 126.4 parts of mixed crystal pigment (Pigment Violet 19, γIV phase). At twice the Bragg angle, 2θ, X-ray spectrum shows three strong lines at 6.4°, 13.5° and 26.5°, seven moderate lines at 5.4°, 13.0°, 16.6°, 20.7°, 24.0°, 25.5° and 28.4°, and one weak line at 30.4°.

9.5 parts of mixed crystal pigment are mixed mechanically with 0.5 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent, pure and strongly colored coatings are obtained. The rheology is evaluated as 5 and the viscosity is 3.3 s. The gloss measurement gives a value of 82.

Example 9

450 parts of polyphosphoric acid containing 85.0% $P_2O_5$ are metered into a stirred vessel. Then 142.5 parts of 2,5-dianilinoterephthalic acid and 7.5 parts of 2,5di(3-chloroanilino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 860.8 parts of 85% strength phosphoric acid at 140° C., during which it is hydrolyzed. During this hydrolysis the temperature rises to 160° C. The phosphoric acid concentration after the hydrolysis is 95%. Then 1105 parts of 40% strength phosphoric acid are added dropwise and the suspension is cooled to 120° C. The phosphoric acid concentration thereafter is 70%. The mixture is stirred at 120° C. for 4 hours. The mixture is then cooled to 110° C. and the mixed crystal pigment is filtered off with suction, washed with 70% strength phosphoric acid until the runoff is colorless, washed to neutrality with water, and dried at 80° C. This gives 127.1 parts of mixed crystal pigment (Pigment Violet 19, γIV phase). At twice the Bragg angle, 2θ, X-ray spectrum shows four strong lines at 6.5°, 13.5°, 13.7° and 26.4°, five moderate lines at 13.0°, 16.9°, 23.8°, 25.2° and 28.2°, and four weak lines at 20.5°, 21.4°, 30.4° and 31.7°.

A suspension consisting of 90 parts of 5% isobutanol and 10 parts of crude mixed crystal pigment (Pigment Violet 19, γIV phase) is metered into a stirred ball mill (manufacturer: Draiswerke GmbH, Mannheim) charged with 400 parts of zirconium mixed oxide beads of diameter 0.3–0.4 mm as grinding media. Grinding is carried out at 20° C. for 20 minutes with a stirrer tip speed of 15.6 m/s and a specific power density of 3.1 kW per liter of milling space. The millbase suspension is subsequently sieved to remove the grinding media, the grinding media are rinsed with water, and the millbase suspensions are combined. The combined suspensions are heated at boiling and the isobutanol is distilled off at up to 100° C. at the bridge. After cooling to 60° C., the mixed crystal pigment is filtered off with suction, washed with water and dried at 80° C. This gives 18.6 parts of mixed crystal pigment (Pigment Violet 19, γII phase, with small amounts of α phase). In the PE lacquer, transparent and strongly colored coatings are obtained. The metallic coating is strongly colored and has a dark flop.

Example 10

A suspension consisting of 90 parts of water and 10 parts of crude mixed crystal pigment from Example 9 is metered into a stirred ball mill (manufacturer: Draiswerke GmbH, Mannheim) charged with 400 parts of zirconium mixed oxide beads of diameter 0.3–0.4 mm as grinding media. Grinding is carried out at 20° C. for 20 minutes with a stirrer tip speed of 15.6 m/s and a specific power density of 3.1 kW per liter of milling space. Subsequently the millbase suspension is sieved to remove the grinding media, the grinding media are rinsed with water, and the combined millbase suspensions are filtered off with suction. This gives 28.4 parts of a 35.2% presscake.

For the finish operation, the presscake is introduced into 81.6 parts of water. Then 50 parts of 100% isobutanol and 0.5 part of pigment dispersant of the formula (II) are added. In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0 and m is 2.0. The mixture is heated at boiling, stirred at boiling temperature for 3 hours, and then the isobutanol is distilled off at up to 100° C. at the bridge. After cooling to 60° C. the pigment preparation is filtered off with suction, washed with water and dried at 80° C. This gives 9.9 parts of pigment preparation. In the AM lacquer, transparent, deeply and strongly colored coatings are obtained. The rheology is evaluated at 5 and the viscosity is 4.6 s. The gloss measurement gives a value of 60.

Example 11

A suspension consisting of 90 parts of water and 10 parts of crude mixed crystal pigment from Example 9 is metered into a stirred ball mill (manufacturer: Draiswerke GmbH, Mannheim) charged with 400 parts of zirconium mixed oxide beads of diameter 0.3–0.4 mm as grinding media. Grinding is carried out at 20° C. for 20 minutes with a stirrer tip speed of 15.6 m/s and a specific power density of 3.1 kW per liter of milling space. Subsequently the millbase suspension is sieved to remove the grinding media, the grinding media are rinsed with water, and the combined millbase suspensions are filtered off with suction. The presscake is introduced into a stirring vessel. Then 100 parts of water and 0.25 part of a 50% strength aqueous alkylphenol polyglycol ether sulfate solution are added. The mixture is heated to 60° C. and stirred at 60° C. for 2 hours. Then a pH of 2 is established by adding 0.5 part of 10% strength hydrochloric acid, the mixture is stirred at 60° C. for 1 hour, and the surface-treated pigment is filtered off with suction, washed to neutrality with water and dried at 80° C. This gives 9.1 parts of surface-treated mixed crystal pigment (Pigment Violet 19, γII phase, with small amounts of αphase). In the PU lacquer, very transparent, pure and strongly colored coatings are obtained.

Example 12

200 parts by volume of acetone and 20.0 parts of crude mixed crystal pigment from Example 9 are metered into a porcelain container charged to 90% by volume with 1200 parts of quartzite beads of diameter 2 to 3 mm as grinding media. Fine grinding is carried out for 8 hours with shaking on a vibrating mill (model Vibratom; manufacturer: Siebtechnik Mühlheim) at 1400 revolutions per minute, oscillation circle 4 mm. The millbase is subsequently sieved to remove the grinding media. The grinding media are rinsed with acetone and the combined millbase suspensions are evaporated to dryness. This gives 19.2 parts of mixed crystal pigment (γIV phase). In PVC, strong colorations are obtained. The bleed fastness is excellent.

Example 13

450 parts of polyphosphoric acid containing 85.0% $P_2O_5$ are metered into a stirred vessel. Then 135 parts of 2,5-dianilinoterephthalic acid and 15 parts of 2,5di(4-toluidino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 1607.5 parts of 80% strength phosphoric acid at 135° C., during which it is hydrolyzed. During this hydrolysis the temperature rises to 150° C. The phosphoric acid concentration after the hydrolysis is 87.5%. Then 1209.2 parts of 40% strength phosphoric acid are added dropwise and the suspension is cooled to 120° C. The phosphoric acid concentration thereafter is 70%. The mixture is stirred at 120° C. for 3 hours. Subsequently the mixed crystal pigment is filtered off with suction at 110° C., washed with 70% strength phosphoric acid until the runoff is colorless, washed to neutrality with water, and dried at 80° C. This gives 133.4 parts of mixed crystal pigment (Pigment Violet 19, γIV phase). At twice the Bragg angle, 2θ, X-ray spectrum shows three strong lines at 6.3°, 13.6° and 26.3°, five moderate lines at 12.8°, 16.3°, 20.6°, 23.8° and 28.1°, and two weak lines at 21.4° and 31.20. Lines of 2.9-dimethylquinacridone cannot be detected.

19 parts of mixed crystal pigment are mixed mechanically with 1 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0,and m is 2.0. A pigment preparation is obtained. In the AM lacquer, transparent, pure and strongly colored coatings of deep hue are obtained. The hue is shifted towards the bluer side. The rheology is evaluated as 5 and viscosity is 4.6 s. The gloss measurement gives a value of 85. In the PE lacquer, strongly colored metallic coatings are obtained.

Example 14

450 parts of polyphosphoric acid containing 85.0% $P_2O_5$ are metered into a stirred vessel. Then 135 parts of 2,5-dianilinoterephthalic acid and 15 parts of 2,5-di(3-chloroanilino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into a mixture of 1607.5 parts of 80% strength phosphoric acid and 50 g of cumene at 115° C., during which it is hydrolyzed. During this hydrolysis the temperature rises to 135° C. The phosphoric acid concentration after the hydrolysis is 87.5%. Then 1209.2 parts of 40% strength phosphoric acid are added dropwise and the suspension is cooled to 110° C. The phosphoric acid concentration thereafter is 70%. Then the cumene is removed by distillation. At 100° C. the mixed crystal pigment is filtered off with suction, washed with 70% strength phosphoric acid until the runoff is coloress, washed to neutrality with water, and dried at 80° C. This gives 125.1 parts of mixed crystal pigment (Pigment Violet 19, γII phase).

9.5 parts of mixed crystal pigment are mixed mechanically with 0.5 part of pigment disperant of formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent, pure and strongly colored coatings of deep hue are obtained. The rheology is evaluated as 5 and the viscosity is 5.5 s. The gloss measurement gives a value of 74.

Example 15

450 parts of polyphosphoric acid containing 85.0% $P_2O_5$ are metered into a stirred vessel. Then 135 parts of 2,5-dianilinoterephthalic acid, 11.25 parts of 2,5-di(3-chloroanilino) terephthalic acid and 3.75 parts of 2,5-di(4-toluidino)terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 1607.5 parts of 80% strength phosphoric acid at 135° C., during which it is hydrolyzed. During this hydrolysis the temperature rises to 150° C. The phosphoric acid concentration after the hydrolysis is 87.5%. Then 1209.2 parts of 40% strength phosphoric acid are added dropwise and the suspension is cooled to 120° C. The phosphoric acid concentration thereafter is 70%. The mixture is stirred at 120° C. for 1 hour. Subsequently the mixed crystal pigment is filtered off with suction at 110° C., washed with 70% strength phosphoric acid until the runoff is colorless, washed to neutrality with water, and dried at 80° C. This gives 131.9 parts of mixed crystal pigment (Pigment Violet 19, γIV phase). In the AM lacquer, transparent and strongly colored coatings of deep hue are obtained. The rheology is evaluated as 3 and the viscosity is 4.2 s. The gloss measurement gives a value of 58.

Example 16

450 parts of polyphosphoric acid containing 85.0% $P_2O_5$ are metered into a stirred vessel. Then 135 parts of 2,5-dianilinoterephthalic acid and 15 parts of 2,5-di(3-methoxy-4methylanilino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 1607.5 parts of 80% strength phosphoric acid at 135° C., during which it is hydrolyzed. During this hydrolysis the temperature rises to 150° C. The phosphoric acid concentration after the hydrolysis is 87.5%. Then 1209.2 parts of 40% strength phosphoric acid are added dropwise and the suspension is cooled to 120° C. The phosphoric acid concentration thereafter is 70%. The mixture is stirred at 120° C. for 1 hour. Subsequently the mixed crystal pigment is filtered off with suction at 110° C., washed with 70% strength phosphoric add until the runoff is colorless, washed to neutrality with water, and dried at 80° C. This gives 132.5 parts of mixed crystal pigment (Pigment Violet 19, γII phase with small amounts of γIV phase). In the AM lacquer, transparent and strongly colored coatings of deep hue are obtained. The rheology is evaluated as 3 and the viscosity is 4.2 s . The gloss measurement gives a value of 49.

Example 17

540 parts of polyphosphoric acid containing 85.0% $P_2O_5$ are metered into a stirred vessel. Then 81 parts of 2,5-dianilinoterephthafic acid and 9 parts of 2,5-di(2-chloroanilino) terephthalic acid are introduced at 125° C. with stirring and the mixture is heated at 125° C. for 1 hour during which ring closure takes place to form the quinacridone. The reaction mixture is subsequently metered with stirring over 2 minutes (CG: 50%/min) into 1929 parts of 80% strength phosphoric acid at 135° C., during which it is hydrolyzed. During this hydrolysis the temperature rises to 150° C. The phosphoric acid concentration after the hydrolysis is 87.5 %. Then 1451 parts of 40% strength phosphoric acid are added dropwise and the suspension is cooled to 120° C. The phosphoric acid concentration thereafter is 70%. The mixture is stirred at 120° C. for 1 hour. Then at 110° C. the mixed crystal pigment is filtered off with suction, washed with 70% strength phosphoric acid until the runoff is colorless, washed to neutrality with water, and dried at 80° C. This gives 80.4 parts of mixed crystal pigment (Pigment Violet 19, γII phase).

19 parts of mixed crystal pigment are mixed mechanically with 1 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained.

In the AM lacquer, hiding and strongly colored coatings of deep hue are obtained. The rheology is evaluated as 5 and the viscosity is 3.9 s. The gloss measurement gives a value of 75.

Example 18

1000 parts of polyphosphoric acid containing 83.0% $P_2O_5$ are metered into a stirred vessel. Then 180 parts of 2,5-dianilinoterephthalic acid and 20 parts of 2,5-di(3-chloroanilino) terephthalic acid are introduced at 90° C. with stirring over 70 minutes.

During this addition the temperature rises to 111° C. The mixture is heated to 125° C. and stirred at 125° C. for 3 hours during which ring closure takes place to form the quinacridone. The reaction mixture is subsequently metered into a toothed disk disperser model IKA SD 41 (supplier: Janke & Kunkel, Staufen) at 13,000 rpm with a stator slit width of 3 mm, with a volume flow of 1.92 parts by volume per hour, into a volume flow of 53.4 parts by volume per hour of 85% strength phosphoric acid at 140° C., and is hydrolyzed in 1.2 seconds with the formation of a precipitate. The phosphoric acid concentration after the hydrolysis is 89.9%. This gives 7017 parts of crude pigment suspension. 6848 parts of crude pigment suspension are cooled to 120° C. and 4479 parts of 40% strength phosphoric acid at 25° C. are run in with stirring. Following the addition of phosphoric acid, the phosphoric acid concentration is 70%. The mixture is stirred at 120° C. for 3 hours. Subsequently, the crude mixed crystal pigment is diluted with 10,000 parts of water, filtered off with suction, washed to neutrality with water and dried at 80° C. This gives 96.6 parts of crude mixed crystal pigment.

200 parts by volume of dimethylformamide and 20.0 parts of crude mixed crystal pigment are metered into a porcelain container charged to 90% by volume with 1200 parts of quartzite beads of diameter 2 to 3 mm as grinding media. Fine grinding is carried out for 8 hours with shaking on a vibrating mill (model Vibratom; manufacturer: Siebtechnik Mühlheim) at 1400 revolutions per minute, oscillation circle 4 mm. The millbase suspension is subsequently sieved to remove the grinding media and the grinding media are rinsed with dimethylformamide. The combined millbase suspensions are heated at boiling for 2 hours, then added to 1000 parts of water, and the mixed crystal pigment is filtered off with suction, washed with water until free of dimethylformamide, and dried at 80° C. This gives 19.2 parts of mixed crystal pigment (Pigment Violet 19, γII phase).

9.5 parts of mixed crystal pigment are mixed mechanically with 0.5 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent and strongly colored coatings of deep hue are obtained.

Example 19

1000 parts of polyphosphoric acid containing 83.0% $P_2O_5$ are metered into a stirred vessel. Then 180 parts of 2,5-dianilinoterephthalic acid and 20 parts of 2,5-di(3-chloroanilino) terephthalic acid are introduced at 90° C. with stirring over 60 minutes. During this addition the temperature rises to 115° C. The mixture is heated to 125° C. and stirred at 125° C. for 1 hour during which ring closure takes place to form the quinacridone. The reaction mixture is subsequently metered into a static mixer ®Kenics KMR (length 10 cm, diameter 9 mm, 8 elements, supplier: H. Ott, Neckargmünd) with a volume flow of 2.1 parts by volume per hour, into a volume flow of 44.5 parts by volume per hour of 85% strength phosphoric acid at 140° C., and is hydrolyzed in 0.34 second with the formation of a precipitate. The phosphoric acid concentration after the hydrolysis is 93%. This gives 6445 parts of crude pigment suspension. 6279 parts of crude pigment suspension are cooled to 120° C. and 4479 parts of 40% strength phosphoric acid at 25° C. are run in with stirring. Following the addition of phosphoric acid, the phosphoric acid concentration is 70%. The mixture is stirred at 120° C. for 3 hours. Subsequently, the crude mixed crystal pigment is diluted with 10,000 parts of water, filtered off with suction, washed to neutrality with water and dried at 80° C. This gives 102.6 parts of crude mixed crystal pigment.

200 parts by volume of dimethylformamide and 20.0 parts of crude mixed crystal pigment are metered into a porcelain container charged to 90% by volume with 1200 parts of quartzite beads of diameter 2 to 3 mm as grinding media. Fine grinding is carried out for 8 hours with shaking on a vibrating mill (model Vibratom; manufacturer: Siebtechnik Mühlheim) at 1400 revolutions per minute, oscillation circle 4 mm. The millbase suspension is subsequently sieved to remove the grinding media and the grinding media are rinsed with dimethylformamide. The combined millbase suspensions are heated at boiling for 2 hours then added to 1000 parts of water, and the mixed crystal pigment is filtered off with suction, washed with water until free of dimethylformamide, and dried at 80° C. This gives 18.1 parts of mixed crystal pigment (Pigment Violet 19, γII phase).

9.5 parts of mixed crystal pigment are mixed mechanically with 0.5 part of pigment dispersant of the formula (II). In this formula (II) P is the radical of linear unsubstituted quinacridone and X is the sulfonamido group (V) in which $R^7$ is a hydrogen atom, $R^8$ and $R^9$ are each an ethyl group, n is 3.0, o is 1.0, and m is 2.0. A pigment preparation is obtained. In the AM lacquer, transparent and strongly colored coatings of deep hue are obtained.

What is claimed is:

1. A quinacridone mixed crystal pigment consisting of
   a) from 82.5 to 99% by weight of unsubstituted γ-phase quinacridone of the formula (I)

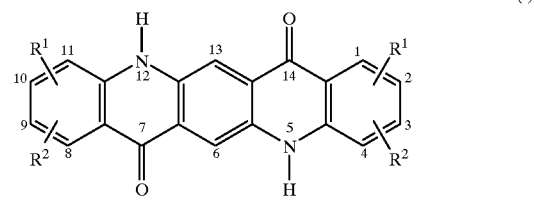

(I)

in which $R^1$ and $R^2$ are hydrogen atoms and
   b) from 1 to 17.5% by weight of one or more 2,9- or 3,10-substituted quinacridones, or of a combination thereof, of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which can be substituted by $C_1$–$C_6$-alkyl groups, and $R^1$ can additionally be a hydrogen atom.

2. A quinacridone mixed crystal pigment as claimed in claim 1, consisting of from 85 to 95% by weight of component a) and from 5 to 15% by weight of component b).

3. A quinacridone mixed crystal pigment as claimed in claim 1, consisting of from 87 to 93% by weight of component a) and from 7 to 13% by weight of component b).

4. A quinacridone mixed crystal pigment as claimed in claim 1, wherein $R^1$ in component b) has the definition hydrogen, chloro, methyl, methoxy or carboxamido and $R^2$ has the definition chloro, methyl, methoxy or carboxamido.

5. A process for preparing a quinacridone mixed crystal pigment wherein the quinacridone mixed crystal pigment consists of
   a) from 82.5 to 99% by weight of unsubstituted γ-phase quinacridone of formula (I)

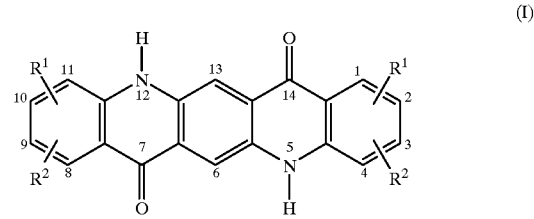

(I)

in which $R^1$ and $R^2$ are hydrogen atoms and
   b) from 1 to 17.5% by weight of one or more 2,9- or 3,1-substituted quinacridones, or of a combination thereof, of the formula (I) in which the substituents $R^1$ and $R^2$ are identical or different and are chlorine, bromine or fluorine atoms or $C_1$–$C_4$-alkyl, $C_1$–$C_4$-alkoxy or carboxamido groups which can be substituted by $C_1$–$C_6$-alkyl groups, and $R_1$ can additionally be a hydrogen atom; the process comprising:

cyclizing 2,5-dianilinoterephthalic acid of formula (Ia)

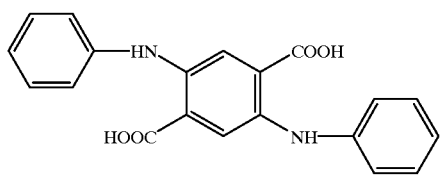

(Ia)

and substituted terephthalic acid(s) of formula (Ib)

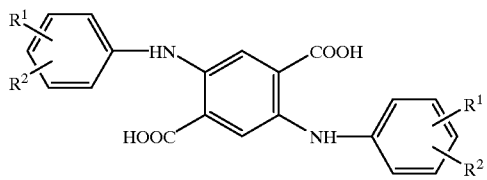

(Ib)

in a ratio of from 82.5:17.5 to 99:1, in the presence of polyphosphoric acid, a polyphosphoric ester, or a mixture thereof, hydrolyzing the ring closure mixture which is present after cyclization, at a temperature of at least 110° C., by metering the ring closure mixture into an amount of at least 70% strength by weight, of aqueous orthophosphoric acid which is such that at the end of the metered addition the concentration of aqueous orthophosphoric acid in the hydrolyzed mixture is at least 85% by weight, and then isolating the mixed crystal pigment, directly or following a fine division step, a finish treatment or both.

6. The process as claimed in claim 5, wherein the compounds of formulae (Ia) and (Ib) are cyclized in a ratio of from 85:15 to 95:5.

7. The process as claimed in claim 5, wherein from 75 to 98 % strength by weight aqueous orthophosphonic acid is metered in.

8. The process as claimed in claim 5, wherein the $P_2O_5$ content of the polyphosphoric acid or polyphosphoric ester is between 80 and 87% by weight.

9. The process as claimed in claim 5, wherein the $P_2O_5$ content of the polyphosphoric acid or polyphosphoric ester is between 83 and 85% by weight.

10. The process as claimed in claim 5, wherein hydrolysis is carried out at a temperature of from 120 to 180° C.

11. The process as claimed in claim 5, wherein hydrolysis is carried out with an amount of orthophosphoric acid such that at the end of the metered addition the concentration of orthophosphoric acid in the hydrolyzed mixture is from 87 to 98% by weight.

12. The process as claimed in claim 5, wherein hydrolysis is carried out with an amount of orthophosphoric acid such that at the end of the metered addition the concentration of orthophosphoric acid in the hydrolyzed mixture is from 88 to 95% by weight.

13. The process as claimed in claim 5, wherein the metered addition is conducted using a concentration gradient of at least 10% per minute.

14. The process as claimed in claim 5, wherein the hydrolysis takes place in a static or dynamic mixer.

15. The process as claimed in claim 5, wherein the hydrolyzed mixture is diluted with water or dilute orthophosphoric acid and heated at from 120 to 180° C.

16. A pigment preparation consisting essentially of a quinacridone mixed crystal pigment as claimed in claim 1 and a pigment dispersant, an anionic, cationic or nonionic surfactant or a mixture thereof.

17. A pigment preparation as claimed in claim 16, wherein the overall content of pigment dispersants and surfactants is from 0.1 to 20% by weight.

18. A pigment preparation as claimed in claim 16, wherein the pigment dispersant is a compound of the formula (II)

$$P-X_m \qquad (II)$$

in which m is a number between 1 and 4;

P is an m-valent radical of a linear quinacridone of the formula (I) according to claim 1 in which $R^1$ and $R^2$ are hydrogen atoms or methyl groups, X is a group of the formula (III)

$$-COOM \qquad (III)$$

or a group of the formula (IV)

$$-SO_3M \qquad (IV)$$

in which

M is the hydrogen ion $H^+$or the equivalent $Mr^+/r$ of an r-valent metal cation, where r is—for the case in question, uniformly—one of the numbers 1, 2 and 3, or an ammonium ion having the structure $N^+R^3R^4R^5R^6$, where the substituents $R^3$, $R^4$, $R^5$ and $R^6$ on the quaternary nitrogen atom are each individually and independently of one another hydrogen atoms or $C_1-C_{30}$-alkyl, $C_2-C_{30}$-alkenyl or $C_5-C_{30}$-cycloalkyl groups, which can be substituted by hydroxyl, di($C_1-C_4$-alkyl)amino, carboxyl or carboxamido groups, or by the group $$-(CH_2-CH_2-O)_v-H$$

in which v is a number between 2 and 20, or by the group $C_2-C_6$-alkyl-$N^+R^4R^5R^6$ or X is a group of the formula (V)

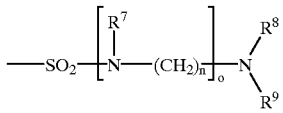

(V)

in which $R^8$ and $R^9$ independently of one another are each a hydrogen atom, a $C_1-C_{20}$-alkyl or $C_2-C_{20}$-alkenyl group or a $C_5-C_7$-cycloalkyl group, or in which $R^8$ and $R^9$, together with the adjacent nitrogen atom, form an aliphatic or aromatic, five-or six-membered heterocyclic system having in each case from 1 to 3 identical or different ring-member heteroatoms from the group consisting of nitrogen, oxygen and sulfur, $R^7$ is a hydrogen atom or a $C_1-C_4$-alkyl group, n is a number from 1 to 6, o is the number 0 or 1; or X is a group of the formula (VI)

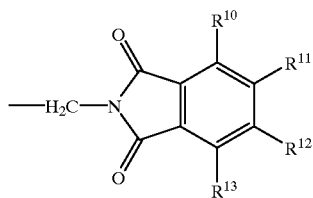
(VI)

in which $R^{10}$, $R^{12}$ and $R^{13}$ are each a hydrogen, fluorine, chlorine or bromine atom and $R^{11}$ is a hydrogen, fluorine, chlorine or bromine atom or is a nitro, $C_1$–$C_5$-alkyl, $C_1$–$C_6$-alkoxy or benzoylamino group.

19. A method of coloring high molecular mass organic materials or inkjet inks comprising the step of adding a quinacridone mixed crystal pigment as claimed in claim 1 to said high molecular mass organic materials or inkjet inks to be colored.

20. The method as claimed in claim 19, wherein the high molecular mass organic material is a plastic, a resin, a coating material, a printing ink or an electrophotographic toner or developer.

* * * * *